(12) United States Patent
Kawasaki et al.

(10) Patent No.: US 6,461,072 B2
(45) Date of Patent: Oct. 8, 2002

(54) STRUCTURE BODY FOR USE IN FRICTION STIR WELDING

(75) Inventors: Takeshi Kawasaki, Kudamatsu; Toshiaki Sagawa, Yanai; Hideyuki Nakamura, Kudamatsu, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/785,482

(22) Filed: Feb. 20, 2001

(65) Prior Publication Data

US 2001/0009334 A1 Jul. 26, 2001

Related U.S. Application Data

(62) Division of application No. 09/637,020, filed on Aug. 14, 2000.

(30) Foreign Application Priority Data

Jan. 24, 2000 (JP) .......................................... 2000-13670

(51) Int. Cl.[7] .............................................. B23K 20/12
(52) U.S. Cl. .................. 403/270; 228/112.1; 228/114.1
(58) Field of Search ............................... 403/270, 265, 403/271; 52/634, 636, 690; 228/112.1, 114.1

(56) References Cited

U.S. PATENT DOCUMENTS 3,221,467 A * 12/1965 Henkels .................... 52/634 X
6,050,474 A * 4/2000 Aota et al. ................ 228/112.1
6,193,137 B1 * 2/2001 Ezumi et al. ............. 228/112.1

FOREIGN PATENT DOCUMENTS

| EP | 0893189 | 1/1999 |
|----|---------|--------|
| JP | 9-221024 | 8/1997 |

* cited by examiner

*Primary Examiner*—Lynne H. Browne
*Assistant Examiner*—John R. Cottingham
(74) *Attorney, Agent, or Firm*—Antonelli, Terry, Stout & Kraus, LLP

(57) ABSTRACT

An abutted portion of face plates 12b and 22b of hollow frame members 10 and 20 is carried out according to a friction stir joining. Next, a connection member 30 is mounted, one end of the connection member 30 is abutted to an end portion of the face plate 11 of the hollow frame member 10. Under this condition, the abutted portion between the face plate 11 and the connection member 30 is carried out according to the friction stir joining. An overlapping portion between another end of the connection member 30 and the hollow frame member 20 is carried out according to the friction stir joining. According to demands, the connection member 30 and the face plate 21 of the hollow member 20 is welded. Without of regard of a dimension accuracy of the hollow frame member and the like, a good joining from one side face of the hollow frame member can be carried out.

7 Claims, 3 Drawing Sheets

STRUCTURE BODY FOR USE IN FRICTION STIR WELDING

This application is a Divisional application of application Ser. No. 09/637,020, filed Aug. 14, 2000.

BACKGROUND OF THE INVENTION

The present invention relates to a friction stir joining method, a structure body manufactured according to a friction stir joining method, a hollow frame member carried out a friction stir joining method, and a connection member for a hollow frame member carried out a friction stir joining method.

For example, the present invention is suitable for a friction stir joining method, a structure body manufactured according to a friction stir joining method of an aluminum alloy made extruded frame member which is used in a railway vehicle or a building structure and the like, a hollow frame member carried out a friction stir joining method, and a connection member body for a hollow frame member carried out a friction stir joining method.

A friction stir joining method is a method in which by rotating a round rod (it is called as "a rotary tool") which is inserted into a joining portion and moving the rotary tool along to a joining line of extruded frame members, and the joining portion is heated, softened and plastically fluidized and solid-stately joined.

The rotary tool is comprised of a small diameter portion which is inserted into the joining portion and a large diameter portion which is positioned at an outside portion of the small diameter portion of the rotary tool. The small diameter portion of the rotary tool and the large diameter portion of the rotary tool have the same axis. A boundary between the small diameter portion of the rotary tool and the large diameter portion of the rotary tool is inserted a little into the joining portion. The above stated technique is disclosed, for example in Japanese application patent laid-open publication No. Hei 9-309164 (EP 0797043 A2).

In FIG. 9 of this document of Japanese application patent laid-open publication No. Hei 9-309164 (EP 0797043 A2), a joining of two faces of the hollow extruded frame members is carried out from one face of the two faces of the hollow extruded frame member. Namely, a plate of one side face is abutted and from another face side of the another plate a friction stir joining is carried out. An outer face side of the plate is joined flatly. An end portion of the plate of the another face side is orthogonal to a thickness direction.

As shown in FIG. 9 of the above stated document of Japanese application patent laid-open publication No. Hei 9-309164 (EP 0797043 A2), a case where a hollow frame member is carried out from a face of one side according to the friction stir joining. In this case, it is important that an interval of plates 33 and 33 of upper faces of two hollow frame members 31 and 32 and an accuracy of a width of a coupling member 60 which is arranged this portion.

Both ends of the coupling member 60 are abutted to the plates 33 and 33 and are joined. For this reason, when the interval of the upper face plates 33 and 33 is smaller than a width of the coupling member 60, it is impossible to arrange the coupling member 60.

In reversibly, when the interval of the upper face plates 33 and 33 is larger than the width of the coupling member 60, it is difficult to carry out the friction stir joining to the abutted portion. Namely, it is important that a gap of the abutted portion formed between the plate 33 and the coupling member 60 is small.

However, in accordance with a manufacturing tolerance during a press-out processing of the hollow frame members 31 and 32 and the coupling member 60 and a manufacturing tolerance during the friction stir joining, to the abutted portion a large gap can occur easily. In a case of the joining of the car body of the railway vehicle, the above large gap is remarkable in the case in which many hollow frame members are joined by putting them side by side.

SUMMARY OF THE INVENTION

An object of the present invention is to provide a friction stir joining method, a structure body manufactured according to a friction stir joining of an aluminum alloy made extruded frame member which is used in a railway vehicle or a building structure and the like, a hollow frame member carried out a friction stir joining method, and a connection member body for a hollow frame member carried out a friction stir joining method in which regardless of a dimension accuracy of a hollow frame member and the like, a good joining of the hollow frame member is carried out from a face of one side thereof.

The above stated object can be attained by in case where one of face plates of a hollow frame member is joined using a connection member, one end of the connection member is carried out according to an abutting joining and another end thereof is carried out according to an overlapping joining.

The above stated object can be attained by a friction stir joining method wherein preparing two hollow frame members in which between two sheet face plates is connected according to plural ribs, and an end portion of one of the two face plates is projected from an end portion of another of the two face plates, joining the projected face plates together with from a side of the another of the two face plates according to a friction stir joining, arranging a respective end portions of one connection member to a connection portion between the end portion of the another of the two face plates of the one of the two hollow frame members and a connection portion between the end portion of the another of the two face plates of the another of the two hollow frame members and the ribs, and carrying out the friction stir joining to an abutted portion between the one of the two hollow frame members and one end of the connection member, and carrying out an overlapping portion between the another of the two hollow frame members and another end of the connection member according to the friction stir joining from an outer side of the two hollow frame members.

The above stated object is attained by a structure body wherein, two hollow frame members are joined, in the respective two hollow frame members, between two sheet face plates is connected according to plural ribs, and an end portion of one of the two face plates is projected from an end portion of another of the two face plates, the projected face plates are carried out together with according to a friction stir joining, a respective end portions of one connection member is carried out the friction stir joining to a connection portion between the end portion of the another of the two face plates of the one of the two hollow frame members and a connection portion between the end portion of the another of the two face plates of the another of the hollow frame members and the ribs, the joining between the one of the two hollow frame members and one end of the connection member is joined to an abutted portion of the two hollow frame members and the connection member, and the joining between the another of the hollow frame members and another end of the connection member is joined to an overlapping portion of the two hollow frame members and the connection member.

DESCRIPTION OF THE INVENTION

One embodiment of a friction stir joining method, a structure body manufactured according to a friction stir joining method, a hollow frame member carried out a friction stir joining method, and a connection member for a hollow frame member carried out a friction stir joining method according to the present invention will be explained from FIG. 1 to FIG. 4.

Figure 1:
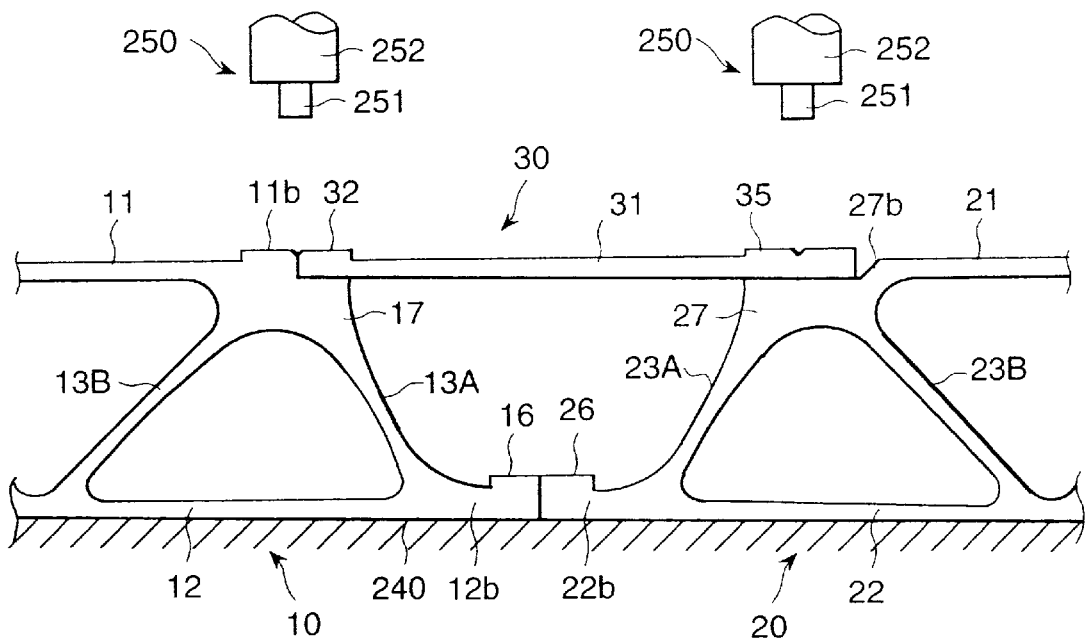
FIG. 1 is a longitudinal cross-sectional view showing a joining portion before a joining of a structure body of one embodiment according to the present invention.
Figure 3:
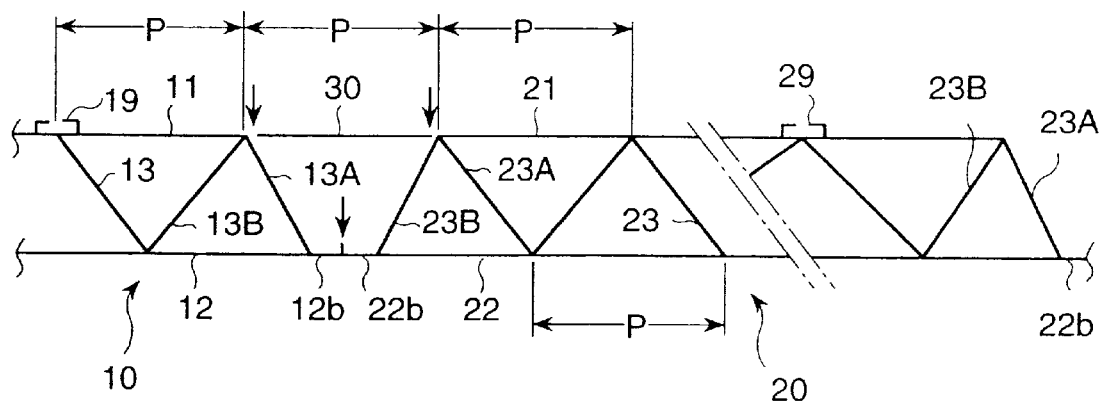
FIG. 3 is a longitudinal cross-sectional view showing a joining portion of a hollow frame member of a structure body of one embodiment according to the present invention.
Figure 4:
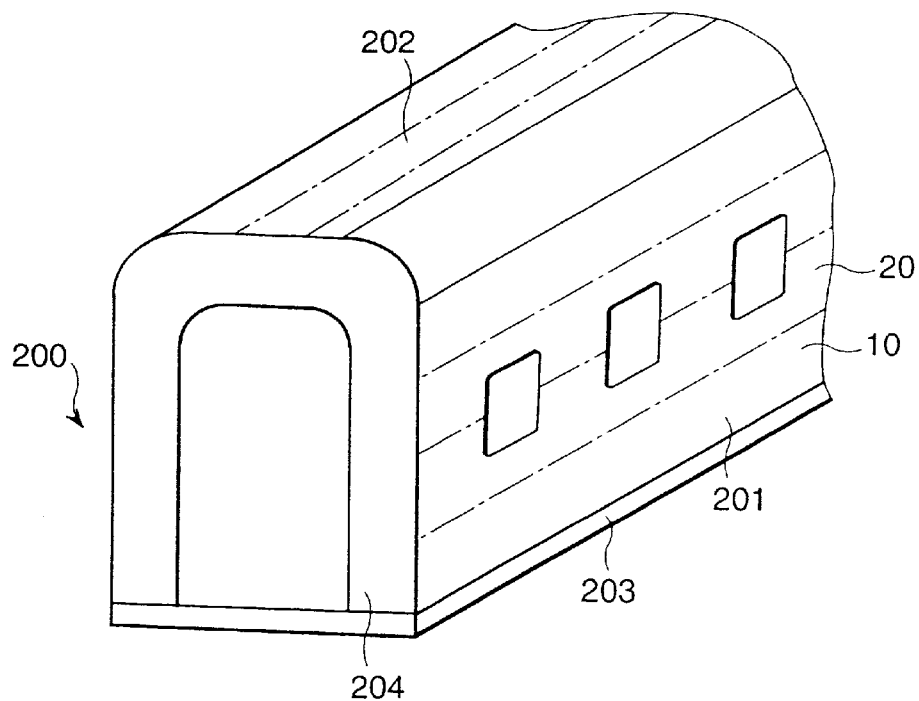
FIG. 4 is a perspective view showing a car body of a railway vehicle.

FIG. 1 is an enlarged view showing an essential portion of a side structure body of a railway vehicle of FIG. 3. FIG. 3 is a longitudinal cross-sectional view showing a side structure body of a structure body of FIG. 4.

A car body 200 of a railway vehicle is comprised of a side structure body 201 for constituting a side face, a roof structure body 202 for constituting a roof, a stand frame 203 for constituting a floor, and a side structure body 204 for constituting an longitudinal direction end portion.

Each of the side structure body 201, the roof structure body 202, and the stand frame 203 is constituted respectively by joining plural extruded frame members. A longitudinal direction of the extruded frame member is formed toward a longitudinal direction of the car body. The extruded frame member is a hollow frame member made of an aluminum alloy.

A constitution and a joining method of a hollow extruded frame members 10 and 20 for constituting the side structure body 201 will be explained. Other portions and other structure bodies are similar to the above.

The hollow frame members 10 and 20 are comprised of two sheet face plates 11, 12 and 21, 22 and truss shape structure arranged plural ribs 13 and 23. The two sheet face plates 11 and 12 are substantially in parallel. The two sheet face plates 21 and 22 are substantially in parallel.

A pitch of the truss structure according to the ribs 13 and 23 is the same. The truss structure is constituted by the ribs 13 and 23 and a center line of a plate thickness of the respective face plates 11, 12 and 21, 22. An apex is formed at a side of the face plates 11, 12 and 21, 22.

At a vicinity of the apex of the truss structure in an inner side of the vehicle, rails 19 and 29 for installing machines and apparatuses are provided integrally. The rails 19 and 29 are comprised of L shape two members. The rails 19 and 29 become seats for installing the machines and apparatuses such as interior mounting plates and chairs and the like.

End portions of the face plates 12 and 22 which are positioned an outer face side of the car body project to a side of the adjacent hollow frame members 20 and 10 from the end portions of the face plates 11 and 21 in the inner side of the car of the railway vehicle. These projected face plates are indicated by 12b and 22b.

By abutting end portions of the face plates 12b and 22b to each other, the friction stir joining is carried out. A plate thickness of each of the face plates 12b and 22b is thicker than another portion of the face plates 12 and 22.

The hollow frame members 10 and 20 are mounted on a bed 240 by laying the face plates 12 and 22 at the lower portion. The side of the face plates 11 and 21 are formed to the upper portion. By inserting a rotary tool 250 to the joining portion from the upper portion and the friction stir joining is carried out. The friction stir joining is carried out from the inner side of the car of the railway vehicle.

To the end portion (the abutted portion) of the face plates 12b and 22b, raised portions 16 and 26 which project in the inner side of the car (namely, the face plates 11 and 21 side) are provided. A width and a height of each of the raised portions 16 and 26 are substantially the same.

Between the end portion of the face plate 11 in the inner side of the car and the end portion of the face plate 21 is joined with a connected through a connection member 30. To the end portion of the connection member 30 is mounted or overlapped to the seats 17 and 27 which are provided on the apex of the truss structure.

The seat 17 is formed at the end portion of the hollow frame member 10 from a normal line which passes through an intersecting point between the rib 13A and the rib 13B. A face reaching from the seat 17 to the outer face (the upper face) of the face plate 11 is formed on the above stated normal line. To an end portion of the face plate 11 at the seat 17 side, a raised portion 11b which projects to the outer face (the upper face) side is arranged.

The end portion of the connection member 30 a raised portion 32 which projects to the outer face (the upper face) side is arranged. A width and a height of the raised portions 11b and 32 are the same to those of the raised portions 16 and 26. The width of the seat 17 is the same to the width of the raised portion 32.

The seat 27 is arranged at an intersecting point between the ribs 23A and the rib 23B as a center. At a center of the width of the seat 27 the above stated intersecting point is arranged. Namely, the apex of the truss structure of the end portion is arranged at a central portion of the width of the seat 27. The face reaching from the seat 27 to the face plate 22 is inclined as a groove for an arc welding to the connection member 30.

A raised portion 35 is arranged to the end portion of the connection member 30 which mounts on the seat 27. A height of the raised portion 35 is similar to that of the raised portions 16, 26, 11b and 32. A width of the raised portion is similar to a sum-up width of the raised portions 16 and 26.

The connection member 30 is arranged to aim to form the surfaces of the plate plates 11 and 21 being continuously just as. The central portion except for the both end portions of the connection member 30 is a plate 31 and a plate thickness of the plate is substantially same to the plate thickness of the face plates 11 and 21. An upper face of the raised portion 35 a V-shape groove 36 is provided.

The groove 36 is arranged at a center of the width of the raised portion 35. A width of the raised portion 35 is larger than a diameter of a large diameter portion 252 of the rotary tool 250. The groove 36 becomes a subject matter for position detecting to lead the rotary tool 250.

The groove 36 is detected by a laser sensor and the axial center of the rotary tool 250 is coincided with the groove 36. An extension line of the groove 36, namely on the axial center of the rotary tool 250, there is the intersecting point of the two rib 23A and rib 23B.

The width of the connection member 30 is smaller than an interval of the face plates 11 and 21 of the two hollow frame members 10 and 20. The connection member 30 is made of the extruded frame member having the same material of the hollow frame members 10 and 20. A length of the connection member 30 is the same of the length of the hollow frame members 10 and 20.

A distance P from the end portion of the face plate 11 to the end portion of the face plate 21 is the same pitch P of the truss structure of the other positions. A distance from the apex of the truss structure of the end portion of the hollow frame member 10 and the apex of the truss structure of the end portion of the hollow frame member 20 is the same pitch P of the truss structure of the other positions.

When the faces plates 11 and 12, 21 and 22 side is the apex, the truss structure of the hollow frame member is an isosceles triangle. However, the truss structure of the end portion of the hollow frame members 10 and 20 is not an isosceles triangle.

For the above stated reason, the rib 13A is connected to a midway of the face plate 12 and the rib 23A is connected to a midway of the face plate 22. Between a connection portion between the rib 13A and the face plate 12 and a connection portion between the rib 23A and the face plate 22, a space for inserting the friction stir joining apparatus is formed.

The manufacturing method of this structure body will be explained. The hollow frame members 10 and 20 are mounted on the bed 240. Next, the face plates 12b and 22b are abutted. Next, these frame members 10 and 20 are fixed on the bed 240.

Next, the portions of the end faces 12d and 22d are fixed temporally according to the arc welding manner. This temporary welding is carried out intermittently.

An upper face of the bed 240 on which the abutted portion of the face plates 12b and 22b are mounted is flat. Three portions which are the vicinity of the abutted portion of the face plates 12b and 22b, an intersecting point vicinity of the ribs 13A and 23A, and the face plates 12b and 22b, and an intersecting point vicinity of the ribs 13B and 23B and the face plates 12 and 22 are mounted on the bed 240 having the same height.

With this condition, the rotary tool 250 of the friction stir joining apparatus is inserted from the upper portion to the abutted portion of the raised portions 16 and 26 and is moved along to a joining line and then the friction stir joining is carried out. The axial center of the rotary tool 250 is a perpendicular direction (the direction along to the normal line of the joining portion). However, against an advancing direction of the rotary tool 250 the axial center is inclined as already have known.

The rotary tool 250 comprises the large diameter portion 252 and the small diameter portion 251 at a tip end of the large diameter portion 252. The tip end (the lower end) of the small diameter portion 251 of the rotary tool 250 is positioned at a vicinity of a lower face from an upper face of the face plates 12b and 22b. The lower end of the large diameter portion 252 of the rotary tool 250 is positioned between the apex of the raised portions 16 and 26 and between the face plates 12b and 22b of the inner side of the car of the railway vehicle (the face side of the plates 11 and 21).

A diameter of the large diameter portion 252 of the rotary tool 250 is smaller than a width which is comprised of the two raised portions 16 and 26. The small diameter portion 251 of the rotary tool 250 forms a screw member.

During the friction stir joining, the apex face of the raised portions 16 and 26 is pressed under a low portion a roller which moves the rotary tool 250 each other.

The raised portion 16 and 26 are detected by the laser sensor. According to this, a height position of the raised portions 16 and 26 is requested and an insertion amount of the rotary tool 250 is determined. Further, a gap of the abutted portion of the two raised portions 16 and 26 is requested and to this position the axial center of the rotary tool 250 is coincided with.

According to this friction stir joining the gap of the abutted portion of the faceplate 12b and 22b is buried and joined. The original material of the metal for burying the gap is the raised portions 16 and 22. The outer face side (the outer side of the car) of the face plates 12b and 22b is joined flatly. To the outer face side of the face plates 12b and 22b, no recessed portion of the joining line exists.

The upper face of the raised portions 16 and 26 becomes a convex form according to the large diameter portion 252 of the rotary tool 250. At the both ends of the recessed portion, the raised portions 16 and 26 are left.

Next, the connection member 30 is mounted on the seats 17 and 27 of the face plates 11 and 21. One end (an end portion of the raised portion 32) of the connection member 30 is abutted an end portion of the plate 11 (a boundary between the raised portion 11b and the seat 17).

Next, the end portion of the connection member 30 is fixed temporally to the face plates 11 and 21 according to the arc welding manner. This temporary welding is carried out intermittently.

Next, using the friction stir joining apparatus which is used to the friction stir joining of the abutted portion of the face plates 12b and 22b the joining for one end of the connection member 30 and the end portion of the face plate 11 is carried out. This is same of the joining of the abutted portion of the raised portions 16 and 26.

Next, the joining of the seat 27 and other end of the connection member 30 is carried out. With a condition where the rotary tool 250 is inserted in to a portion to which the connection member 30 and the seat 27 are overlapped, the rotary tool 250 is moved along to the joining line and the friction stir joining is carried out. A width of the raised portion 35 is larger than the diameter of the large diameter portion 252 of the rotary tool 250.

At a center of the raised portion 35 the groove 36 is provided. The rotation axial center of the rotary tool 250 is coincided with the groove 36. A tip end of the small diameter portion 251 of the rotary tool 250 is inserted deeply to the seats 17 and 27. With this construction, the overlapping joining is carried out. The lower end of the large diameter portion 252 of the rotary tool 250 is positioned between the upper face of the connection member 30 being the non-raised portion and the apex of the raised portion 35.

The upper face of the raised portion 35 become a recess form according to the large diameter portion 252 of the rotary tool 250. The upper face of the raised portion 35 becomes a recess form according to the large diameter portion 252 of the rotary tool 250. At the both ends of the recessed portion the raised portion 35 is left.

The above stated sensor of the friction stir joining apparatus detects the groove 36 and along to the groove 36 the rotary tool 250 is moved.

Figure 2:
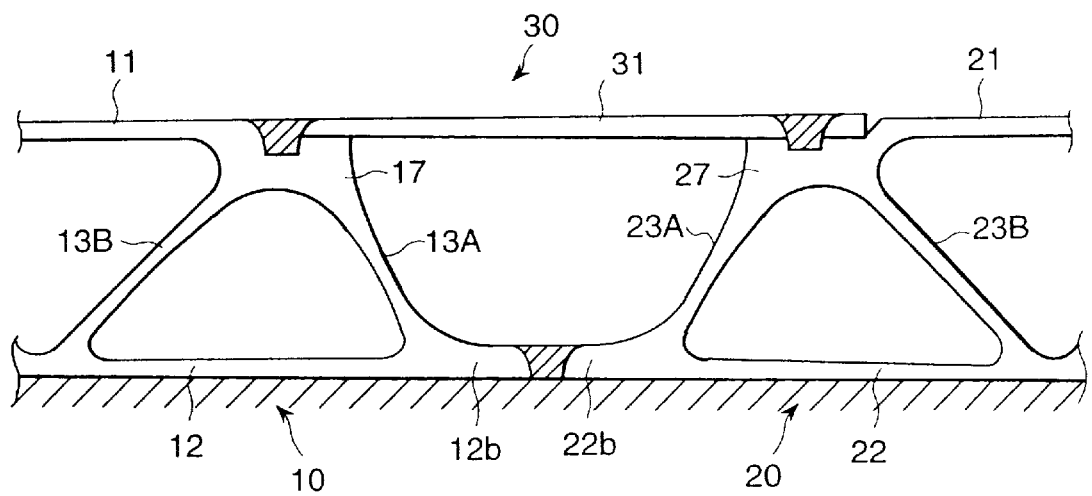
FIG. 2 is a longitudinal cross-sectional view showing a joining portion after a joining of a structure body one embodiment according to the present invention.

FIG. 2 is schematic view showing a condition of the joining portion of the structure body after the joining. A hatching portion shows the joining portion.

The axial center of the rotary tool 250 is positioned at the apex point of the truss structure of the two ribs 13A 15 and 13B (23A and 23B) or through the perpendicular line of a vicinity thereof passes. Against the eccentric matter, it corresponds to an increase of the plate thickness of the ribs 13A and 13B (23A and 23B), a shape of the arc for connecting the rib and the face plate, a thickness of the connection member 20 30, and the thickness of the seats 17 and 27, etc. . .

When two rotary tools are used, the joining of the both ends of the connection member 30 can be carried out at the same time.

According to the above stated construction, since one of the overlapping coupling is made to the abutted coupling, according to an improvement of the coupling efficiency and a reduction of a stress concentration in a bending portion, a strength can be improved.

Further, since the arc welding can be lessened, a thermal distortion of the structure body can be lessened, an appearance of the structure body can be improved, further an installation of an interior mounting material can be carried easily.

According to the above stated construction, the joining of the both faces of the hollow frame members is carried out from one side face. For this reason, it is unnecessary to reverse the structure body to which one face is joined. Accordingly, the structure body can be manufactured at a low cost and with a high accuracy.

Further, the outer face of the joining portion of the face plates 12b and 22b can be joined flatly. The raised portions 16, 26 and 35 are arranged in the inner side of the structure body and the inner side of the car but not existed at a portion (the outer face side, the outer side of the car) in which a flat face is required.

Further, at the outer side of the car no raised portion which causes by deleting according to the rotary tool 250 exists. For this reason, the cut-off etc. of the raised portion is unnecessary and the car body can be manufactured at a low cost.

Further, the bed 240 can be replaced by a backing member such as a roller etc. . .

Further, the abutted portion is joined at first, and next the overlapping portion is joined. For this reasons, comparing the reversal case, it is considered that the good friction stir joining can be carried out.

It is considered that the strength of the joining portion of the overlapping portion (the joining portion of the seat 27 and the connection member 30) and the strength of the strength of the bending portion of the place plate 21 are inferior than the strength the abutted portion (the joining portion of the face plate 11 and the connection member 30).

In this case, the end portion of the connection member 30 and the end portion of the face plate 21 are joined according to the arc welding manner. This arc welding can be carried out a portion necessary to have more strength, for example only a position near to a window corner portion.

Further, the member which is joined by the above stated manner can be used as an outer face (a face to be viewed by eye) of the structure member such as a building structure.

The portion for mounting the connection member 30 can be set at the structure and the portion in which it can bear to the load during the friction stir joining. For example, the structure and the portion can be set as shown in FIG. 9 of the above stated document of Japanese application patent laid-open publication No. Hei 9-309164 (EP 0797043 A2).

A further embodiment of a structure body carried out a friction stir joining according to the present invention shown in FIG. 5A and FIG. 5B will be explained. This is suited for a case in which by joining three and more than three hollow frame members a large structure body is manufactured. For example, the side structure body 201 is constituted by the three frame members. The relationship between the hollow frame member 10 (for example, a first frame member) and the hollow frame member 20 (for example, a second frame member and a central frame member) at the left side and the connection member 30 is similar to the embodiment of the structure body shown in FIG. 1.

To another end (the right end) of the central hollow frame member 20 (the second frame member) the left end of a hollow frame member 40 (for example, a third frame member) and the connection member 30B are joined. The left end of the hollow frame member 40 (the third frame member) and the connection member 30B are joined. The left end of the hollow frame member 40 (the third frame member) and the connection member 30B are same to the left end of the central hollow frame member 20 (the second frame member) and the connection member 30.

The structure of the another end (the right end) of the central hollow frame member 20 (the second frame member) is same the structure of the right end of the hollow frame member 10 (the first frame member). The structure of the left end of the hollow frame member 40 (the third frame member) which is joined to the right end of this hollow frame member 10 (the first frame member) is same to the right end of the central hollow frame member 20 (the second frame member). The structure and the direction of the connection member 30B are same to those of the connection member 30.

Figure 5A:
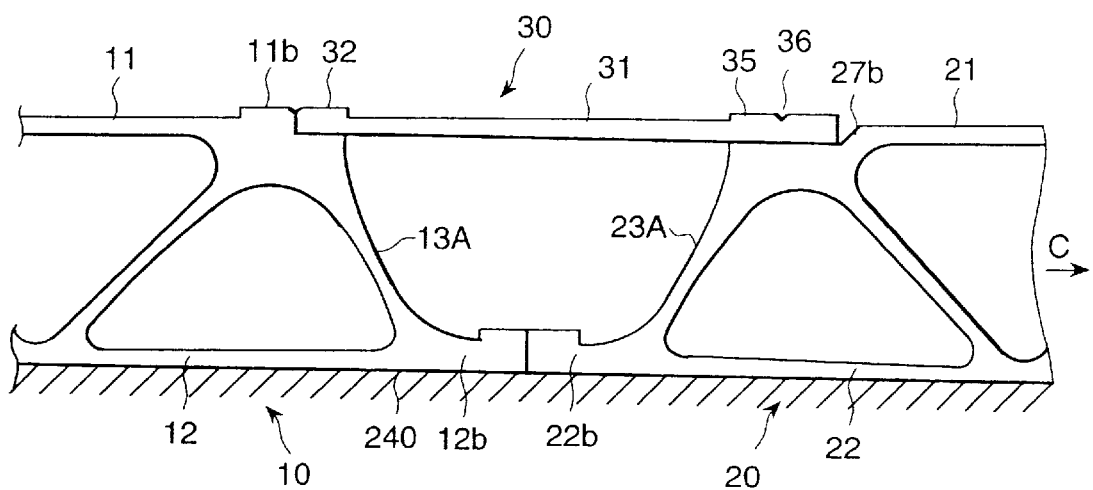
FIG. 5A is a longitudinal cross-sectional view showing a joining portion of a structure body another embodiment according to the present invention.
Figure 5B:
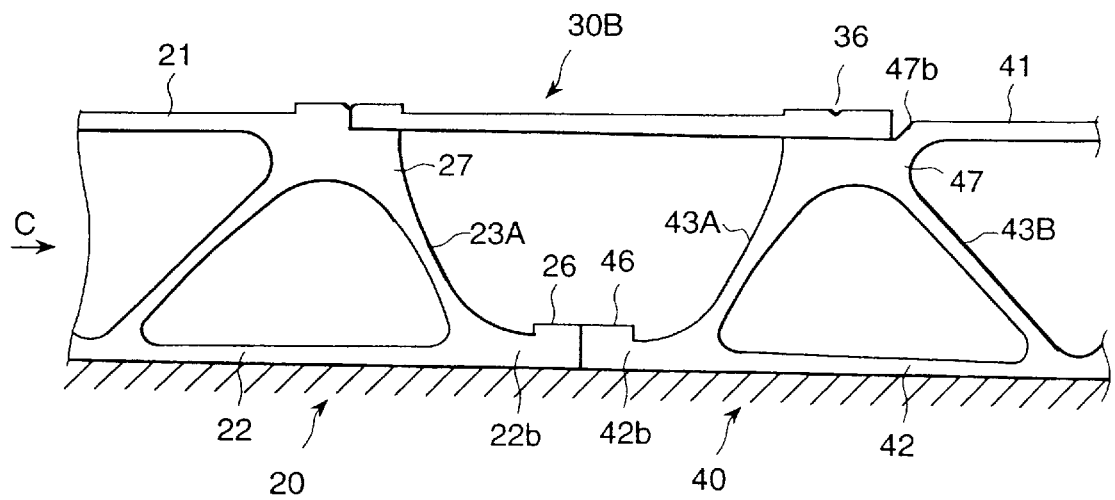
FIG. 5B is a longitudinal cross-sectional view showing a joining portion of a structure body another embodiment according to the present invention.

The left end of the central hollow frame member 20 (the second frame member) and the hollow frame member 10 (the first frame member) are shown in FIG. 5A. The right end of the central hollow frame member 20 (the second frame member) and the hollow frame member 40 (the third frame member) are shown in FIG. 5B. The left end of the central frame member 20 (the second frame member) shown in FIG. 5A extends to the right end of the central frame member 20 (the second frame member) shown in FIG. 5B, and an intermediate portion of the right end of the central frame member 20 (the second frame member) is omitted.

The hollow frame member 40 (the third frame member) is comprised of two sheet face plates 41 and 42, truss structure arranged plural ribs 43A and 43B and a seat 47. The face plate 42 has a projected plate 42b and a raised portion 46 and the face plate 41 has a slope face 47b.

Namely, when the three hollow frame members 10, 20 and 40 are carried out to join, to one end (the left end) of the face plate 21 of the central hollow frame member 20 (the second frame member), a slope face 27b is provided, and to another end (the right end) of the face plate 21 a raised portion (it corresponds to the raised portion 11b) is provided.

With this construction, all of the directions of the raised portion 32 of the connection members 30 and 30B at the both ends of the central hollow frame member 20 (the second frame member) direct in the left portion.

As a result, since the directions of the raised portions 32 of the plural connection members 30 direct in the same direction, the erroneous arrangement of the connection members 30 can be lessened.

The joining procedure is that the three hollow frame members 10, 20 and 40 are mounted on the bed 240 and restricted. Hereinafter is similar to that of a case of FIG. 1.

The technical range according to the present invention is not limited to the wordings stated on each claims of the "what is claimed is" item or the wording stated on the "means for solving the problems", however it can refer to a range in which a person who belong to this field can be placed easily:

According to the present invention, without of regard of the dimension accuracy of the hollow frame member and the like, the good joining from one side face of the hollow frame member can be carried out.

What is claimed is:

1. A structure body comprising:

two hollow frame members which are joined;

each of said two hollow frame members includes two face plates, and between said two face plates and connected thereto are plural ribs; and a first end portion of one of said two face plates projects beyond a second end portion, of the other of said two face plates of each hollow frame member;

the first, projected end portions of the face plates of the two hollow frame members are joined together by a friction stir welding;

a connection member is provided between the second end portions, of the other of the two face plates of the two hollow frame members, and respective end portions of the connection member are joined by friction stir welding to a connection portion of the second end portion of the other of said two face plates, of one of said two hollow frame members, and to a connection portion of the second end portion of the other of said two face plates of the other of said two hollow frame members and said ribs;

said friction stir welding between said one of said two hollow frame members and one end portion of said connection member is at an abutted portion of said one of said two hollow frame members and said connection member; and said friction stir welding between the other of said two hollow frame members and the other end portion or said connection member is at an overlapping portion of said frame and said connection member.

2. A structure body according to claim 1, wherein the other of the two hollow frame members and the other end of the connection member are welded with a joining portion of the other of said two hollow frame members and the other end of said connection member arranged adjacent each other.

3. A structure body comprising:

a first hollow frame member, a second hollow frame member, and a third hollow frame member which are joined;

each of the three hollow frame members includes two face plates, and between said two face plates and connected thereto are plural ribs; and a first end portion of one of said two face plates projects beyond a second end portion, of the other of said two face plates of each hollow frame member;

the second end portion of the other of said two face plates of said first hollow frame member and the second end portion of the other of said two face plates of said second hollow frame member are joined through a first connection member;

the other second end portion of the other of said two face plates of said second hollow frame member and the other end portion of the other of said two face plates of said third hollow frame member are joined through a second connection member;

the respective joinings of said connection members with the second end portions are friction stir weldings;

said friction stir weldings between said first hollow frame member and said first connection member and said friction stir welding between said second hollow frame member and said second connection member are abutting joinings; and said friction stir welding between said second hollow frame member and said first connection member and said friction stir welding between said third hollow frame member and said second connection member are an overlapping joining.

4. A hollow frame member, comprising:

two face plates;

plural ribs, said plural ribs being connected between said two face plates;

an end portion of one of said two face plates being projected beyond an end portion of another of two face plates;

at said end portion of said one of said two face plates, a raised portion is provided;

a recessed portion is opened at a side of said end portion of the other of said two face plates;

said recessed portion and an outer face of the other of said two face plates are connected through a slope face; and said end portion of said one of said two face plates and said recessed portion are adapted to be subjected to friction stir welding.

5. A hollow frame member according to claim 4, further comprising a connection portion at said end portion of the other of said two face plates, said recessed portion being provided at said connection portion.

6. A hollow frame member according to claim 5, wherein said connection portion is a portion where ribs, of said plural ribs, are connected at said other of said two face plates.

7. A hollow frame member according to claim 6, wherein said ribs connected at said connection portion include a rib, of the plural ribs, extending closest to said end portion of the one of said two face plates.

* * * * *